3,064,985
CHUCK FOR GEARS AND THE LIKE
Milton L. Benjamin, Shaker Heights, and David D. Walker, Chagrin Falls, Ohio, assignors to Erickson Tool Company, Solon, Ohio, a corporation of Ohio
Filed Nov. 3, 1960, Ser. No. 67,113
8 Claims. (Cl. 279—4)

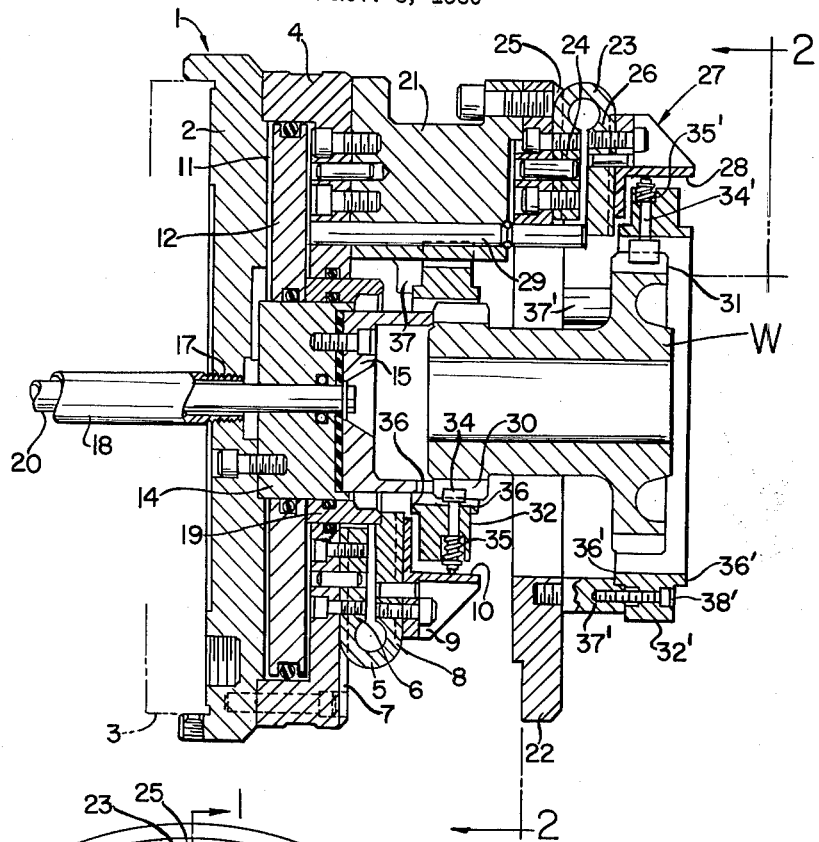

The present invention relates as indicated to a chuck for gears and the like and, more particularly, to a chuck that is adapted to hold combination or cluster gears that have teeth of the same or different pitch formed on the same or different pitch diameters.

In the automotive industry, and in other industries as well, it is common practice to employ cluster gears in transmissions and the like, in which the parts thereof are integrally formed with gear teeth on different pitch diameters or gears that are axially spaced apart. In such cluster gears it is usually required that the gears not only be concentric to each other, but that the bore thereof be concentric with such gears or that the faces be perpendicular to the common centerline of the gears.

In known chucks for combination gears it is a time-consuming, tedious and difficult matter to adjust them to hold successive production runs of different combination gears.

Accordingly, it is a principal object of this invention to provide a universal chuck which carries plural sets of similar spring jaws in which cages are replaceably mounted to accommodate the different combination gears with which the chuck is adapted to be used.

It is another object of this invention to provide a simplified form of reversible cage to greatly extend the usefulness thereof with a variety of different sizes and types of gears.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a cross-section view of a chuck embodying the present invention, such section having been taken substantially along the line 1—1, FIG. 2; and FIG. 2 is a front elevation view, partly broken away showing one of the three front jaws, and one of the three rear jaws, and portions of the respective front and rear spring cages for engaging the respective teeth of a combination gear.

Referring in detail to the drawing, the chuck 1 herein comprises a mounting plate 2 which is adapted to be secured on the spindle 3 of a machine tool and which has bolted thereto a rear jaw carrier plate 4 which carries a set of three spring members 5, each of which is of generally U-shape form as disclosed in the copending application of Milton L. Benjamin, Ser. No. 811,708, filed May 7, 1959 now Patent No. 3,006,654. The inner leg 6 of each spring member 5 is secured in a radial groove 7 of plate 4 and the outer leg 8 has mounted thereon a jaw member 9 formed with an inner arcuate face 10. Said rear jaw carrier plate 4 forms with the mounting plate 2 a cylinder 11 in which the piston 12 is axially reciprocable, and at the center of the mounting plate 2 there is mounted a stop block 14 to which the workpiece stop member 15 is secured. The mounting plate 2 is provided with an air pressure inlet port 17 to which the air supply pipe 18 is adapted to be connected. As evident, when air under pressure is admitted into the left chamber of the cylinder 11, the piston 12 will be urged to the right and in so moving it will force the ring 19 toward the right and said ring 19, in turn, bears on the inner faces of the outer legs 8 of the spring members 5 to swing the jaw members 9 outwardly to a position which will release the workpiece W as later described in detail. The stop mounting block 14 is formed with a central opening through which the coolant supply pipe 20 extends for supplying coolant to the work W which is adapted to be held in the chuck 1, such coolant pipe 20 being disposed concentrically within the air pressure supply pipe 18 and both pipes 18 and 20 extending through the hollow spindle 3 of the machine tool.

Mounted on said rear jaw carrier plate 4 are three blocks 21 which, as shown herein, have mounted thereon a front jaw carrier ring 22 on which is mounted a series of three front spring members 23. The spring members 23 are axially and circumferentially offset with respect to the rear set of spring members 5 and jaws 9 and also are disposed radially outward with respect to the rear set of jaws 9. The legs 24 are fixed in radial grooves 25 of the ring 22 and the legs 26 carry front jaw members 27 with inner arcuate faces 28. The front jaw members 27 are moved radially outwardly to release the workpiece W as by a corresponding series of rods 29 which have their opposite ends engaged with the piston 12 and with the inner faces of the outer legs 26 of said front spring members 23. Thus, when the piston 12 is moved to the right, as previously mentioned, the front jaw members 27 will be swung outwardly to release the workpiece W by the corresponding movement of the rods 29 acting on the legs 26 of spring members 23.

In the particular example shown, the combination or cluster gear W may be integrally formed at one end with a helical gear 30 and at the other end with another helical gear 31 of larger pitch diameter. For each gear 30 and 31 there will be provided a cage 32 and 32' respectively and, accordingly, when a particularly workpiece W is to be held, all that the machine operator has to do is to mount in the chuck 1 specific cages 32 and 32' for the respective gears 30 and 31.

In the present case both cages 32 and 32' are of similar construction, and accordingly the same reference numerals are used except for the prime (') designation of the components of cage 32'. Thus, each cage 32 (32') comprises an unbroken circular ring formed with radial openings for the locators 34 (34'). It is to be noted that the radial openings in each cage 32 (32') are axially offset from the median transverse plane thereof for reversal end for end. Thus, in workpieces W where the gears 30 and 31 are spaced apart different distances, one or both cages 32 and 32' may be reversely mounted to accommodate such different workpieces W.

The smaller cage 32 may be cut away to clear the blocks 21 and pins 29. When the jaws 9 and 27 are moved out to release the workpiece W, the locators 34 (34') are yieldably urged outwardly out of engagement with the teeth of the workpiece W by springs 35 (35') so that the next workpiece may be positioned within the locators 34 (34') and against the stop 15 and when the air pressure behind the piston 12 is released, the respective sets of spring jaw members 9 and 27 will swing inwardly thereby pressing the locators 34 (34') radially inwardly to engage their inner tooth engaging grooves with the teeth of the respective gears 30 and 31 thereby holding the workpiece W for finishing operations with the common axis of the gears 30 and 31 coinciding with the axis of rotation of the chuck 1.

Preferably, the rear set of jaw members 9 will have their inner faces 10 ground when an air pressure of 10 p.s.i. is applied to the rear side of the piston 12. On the other hand, it is preferred to apply an air pressure of 30 p.s.i. on the piston 12 when grinding the inner faces 28 of the front set of jaw members 27. Then, when, for example, an air pressure of 40 p.s.i. is admitted behind the piston 12, both sets of jaw members 9 and 27 will be swung outwardly to permit loading of the workpiece W. Accordingly, when the air pressure behind the piston 12 is vented, both sets of jaw members 9 and 27 will seek a position which is less than the ground diameters of the jaw faces 10 and 28 so as to resiliently grip the teeth of the gears 30 and 31 of the workpiece W which is inserted into the chuck 1 and into engagement with the work stop 15. Because the jaw members 9 and 27 have an axial inward component of movement, the end of the workpiece W will be firmly held against stop 15.

In summary, therefore, it can be seen that the present chuck 1 is of very simple form with which reversible cages 32 (32') may be employed for accurately and securely holding various sizes and types of combination gears W or the like for performance of finishing operations thereon. The combination or cluster gear W herein is only an example of a workpiece that may be chucked in the chuck 1 and obviously instead of gear 30 the workpiece may have a splined shaft portion held by cage 32 and a spur or helical gear 31 held by cage 32'. In any event each chuck 1 may have several cages 32 and several cages 32' for use selectively with many different sizes and types of workpieces. Furthermore, the reversibility of the cages 32 and 32' greatly extends the number of different workpieces W with which the cages may be used.

The opposite ends of cage 32 (32') are formed with locating ribs 36 (36') which in the case of cage 32 interfit with lugs 37 of the blocks 21, the cage 32 being detachably and reversibly mounted as by screws 38 having threaded engagement with said lugs. The rib 36' of cage 32' interfits with arcuate notches formed in the posts 37' screwed into ring 22, and screws 38' have threaded engagement in said posts 37' to detachably mount the cage 32'. In addition to the cage reversibility feature, it is to be noted that the work stop 15 is detachably mounted so that a different one may be substituted.

Other modes of applying the principle of the invention may be employed, change being made as regards the details described, provided the features stated in any of the following claims, or the equivalent of such, be employed.

We particularly point out and distinctly claim as our invention:

1. A chuck for combination gears and like workpieces comprising a jaw carrier adapted to be secured to a machine tool spindle; a first set of jaw assemblies mounted in circumferentially spaced relation on said carrier for radial movement to release and to grip a portion of such workpiece; a set of axially extending blocks secured to said carrier between said jaw assemblies; a second set of jaw assemblies mounted on said blocks in axially and circumferentially offset relation to said first set of jaw assemblies for radial movement to release and to grip another portion of such workpiece; and first and second cages detachably secured in fixed relation to said carrier; each cage having locators interposed between the jaw assemblies of each set and the aforesaid portions of the workpiece and actuated radially to grip said portions of the workpiece by radial movement of said jaw assemblies.

2. The chuck of claim 1 wherein each set of jaw assemblies comprises spring jaw members; and wherein a common actuator is provided to simultaneously move said jaw members in a radial direction to release a workpiece from said locators.

3. The chuck of claim 1 wherein each cage has radial guide bores for said locators that are axially offset from the central transverse plane of said cage, and wherein each cage is reversibly detachably mounted to accommodate different workpieces.

4. The chuck of claim 1 wherein each jaw assembly comprises a generally U-shaped spring member having one radial leg secured to said jaw carrier or to said block, and a jaw member secured to the other radial leg; and wherein a common actuator is provided to simultaneously apply transverse force on all of said other legs to yieldably spread apart said one and other legs of said spring members and thereby swing the respective jaw members radially outward for release of said locators from the workpiece.

5. The chuck of claim 1 wherein each jaw assembly comprises a generally U-shaped spring member having one radial leg secured to said jaw carrier or to said block, and a jaw member secured to the other radial leg; and wherein a common actuator is provided to simultaneously apply transverse force on all of said other legs to yieldably spread apart said one and other legs of said spring members and thereby swing the respective jaw members radially outward for release of said locators from the workpiece; said actuator comprising a fluid pressure actuated piston, a tubular member interposed between said piston and said first set of jaw assemblies, and a series of rods extending through said blocks and interposed between said piston and said second set of jaw assemblies.

6. The chuck of claim 1 wherein said jaw carrier has a fixed workpiece stop adapted to be engaged by an end of the workpiece; and wherein said stop is provided with a coolant supply passage through which coolant is supplied to the workpiece held by the chuck.

7. A chuck for gears and like workpieces comprising a jaw carrier adapted to be secured to a machine tool spindle; a first set of jaw assemblies mounted in circumferentially spaced relation on said carrier for radial movement to release and to grip a workpiece; and a first cage detachably secured in axially fixed relation to said carrier; said cage comprising a ring having radial openings therethrough lying in a transverse plane offset from the central transverse plane of said ring, and a series of radial locators in such openings interposed between said jaw assemblies and the workpiece and actuated radially to grip the workpiece by radial movement of said jaw assemblies, said ring having axial mounting holes for securing either end face thereof in predetermined axially fixed position with respect to said carrier.

8. The chuck of claim 7 wherein a second set of jaw assemblies is mounted on said carrier in circumferentially and axially offset relation to said first set of jaw assemblies also for radial movement to release and to grip the workpiece, and wherein a second cage is detachably secured in axially fixed relation to said carrier and axially spaced from said first cage; said second cage comprising a ring having radial openings therethrough lying in a transverse plane offset from the central transverse plane of said ring, and a series of locators in such openings interposed between said second set of jaw assemblies and the workpiece and actuated radially to grip the workpiece by radial movement of said second set of jaw assemblies, said ring of said second cage having axial mounting holes for securing either end face thereof in predetermined axially fixed position with respect to said carrier.

References Cited in the file of this patent

UNITED STATES PATENTS

| | | |
|---|---|---|
| 2,524,468 | Ouimette | Oct. 3, 1950 |
| 2,565,430 | Hohwart | Aug. 21, 1951 |
| 2,568,585 | Hohwart | Sept. 18, 1951 |
| 2,639,157 | Buck | May 19, 1953 |
| 3,006,653 | Benjamin | Oct. 31, 1961 |